July 5, 1932.  H. E. PRIEM  1,866,484
WEDGE CLAMP
Filed Nov. 4, 1929
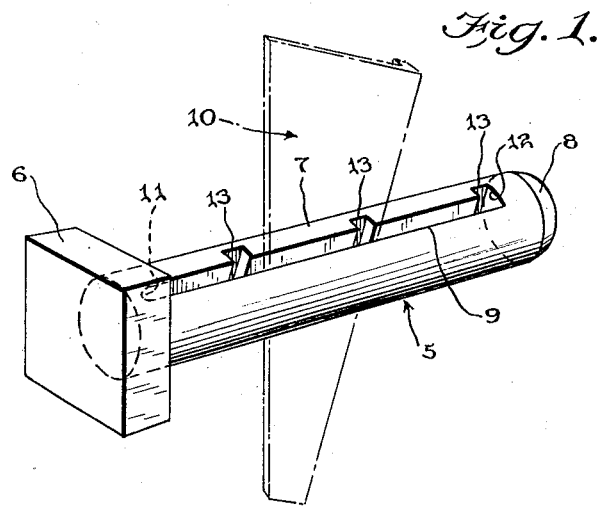
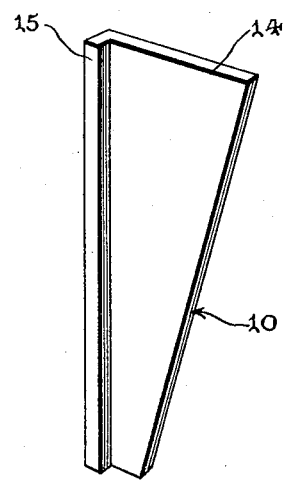
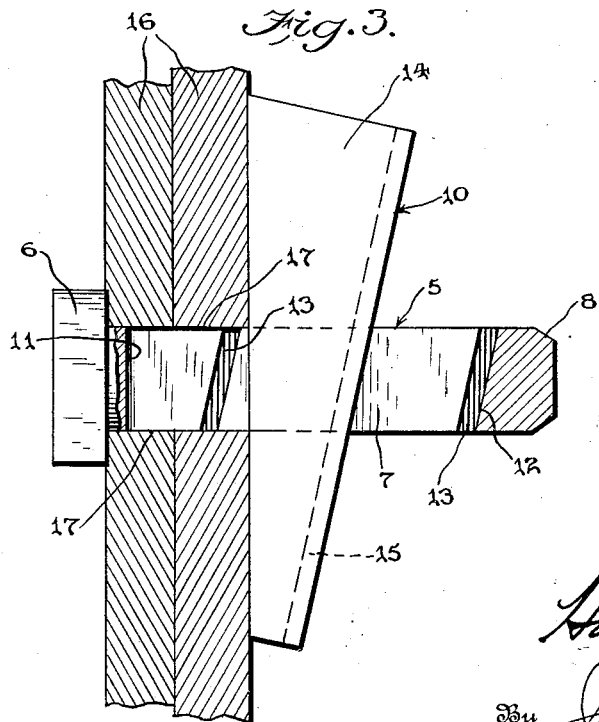

Patented July 5, 1932

1,866,484

UNITED STATES PATENT OFFICE

HARRY E. PRIEM, OF DUNMORE, PENNSYLVANIA

WEDGE CLAMP

Application filed November 4, 1929. Serial No. 404,851.

This invention relates to improvements in wedge clamps of the kind employed to secure metal sheets together until they are permanently joined by riveting or the like.

One of the objects of the invention is to provide a device of this character, including a wedge and a slotted bolt, the latter having a square or angular head so that it can be turned to change the position of the slot in the bolt in case of any interference during the driving of the wedge.

Another object is to furnish a slotted bolt for this purpose having a tapered end to facilitate the ready insertion of the bolt in a hole or holes in the metal plates.

Another object is to provide a structure of this character, in which the parts are adjustable to accommodate metal sheets of various thicknesses, and to eliminate the expense of buying washers, and the time consumed in applying such washers.

A still further object is to furnish a device of this kind, in which the wedge element is of angle shape in cross section. Such shape renders the wedge easier to strike with a hammer than a flat wedge.

With the foregoing objects outlined and with other objects in view which will appear as the description proceeds, the invention consists in the novel features hereinafter described in detail, illustrated in the accompanying drawing, and more particularly pointed out in the appended claims.

Referring to the drawing,

Fig. 1 is a perspective view of the bolt element of my improved clamp.

Fig. 2 is a similar view of the wedge portion of the clamp.

Fig. 3 is a vertical sectional view with the parts assembled and shown as clamping two metal sheets.

In the drawing, 5 indicates the metal bolt portion of the wedge which includes a square or angular head 6, that is integral with a cylindrical shank 7 whose extremity is tapered, as shown at 8, to facilitate the passing of the same through holes in sheet metal or the like. The angular head enables the bolt to be readily turned so as to bring its slot 9 into a desired position to facilitate driving of the wedge 10, which will be described later.

It will be noted that the slot 9 is elongated and extends through the shank of the bolt from a point 11, in close proximity to the head 6, to a point 12 which is close to the tapered portion of the shank, and the slot communicates with a number of notches 13 which are preferably equally spaced from one another.

The bolt cooperates with the wedge 10 which comprises a wedge-shaped body portion 14 having at one edge a rectangular wing 15 which extends at an angle to the body 14. When the clamp is to be used, the body 14 occupies the slot 9, and the wing 15 extends into one or the other of the notches 13, depending upon the thickness of the metal sheets 16 which are to be connected together.

In operation it will be understood that one or more of the bolts 5 are extended through holes 17 in the metal sheets, as shown in Fig. 3, and then the wedge will be driven into the slot 9. If the sheets are relatively thick, the wing 15 will occupy the outermost one of the notches 13, but if the sheets are thinner, the wing will enter one of the other notches 13. In either instance, the wedge may then be driven into position so that the plates will be effectively clamped between the wedge, and the head of the bolt. Due to the angular formation of the wedge, its head is relatively large as compared with the ordinary flat wedge, and consequently, such head may be readily struck by a hammer.

It will be appreciated that my wedge clamp may be used for clamping together sheets of various thicknesses without the necessity of employing washers or the like, and furthermore, that the bolt may readily be turned so as to permit the wedge to be driven into place without interference by adjacent bolts or clamps.

The wing 15 on the wedge, and spaced notches 13 on the bolt form coacting means on the bolt and wedge members to guide the wedge along paths spaced lengthwise of the slot 9 of the bolt.

From the foregoing it is believed that the construction, operation and advantages of the invention may be readily understood by those skilled in the art, and I am aware that various changes may be made in the details disclosed without departing from the spirit of the invention, as expressed in the claims.

What I claim and desire to secure by Letters Patent is:

1. An adjustable wedge clamp comprising a slotted bolt member, a wedge member adapted to be inserted into the slot of the bolt member, one of said members having a guiding notch, and the other member having a projection extending into said notch.

2. An adjustable wedge clamp comprising a bolt having an elongated slot communicating with spaced notches, and a wedge member adapted to be inserted into the slot, and having a wing to enter any one of said notches.

3. An adjustable wedge clamp comprising a bolt provided with an elongated slot and communicating spaced notches, and a wedge member adapted to enter said slot and having a wing arranged at an angle to the main portion of the wedge, and shaped to pass through any one of said notches.

4. A wedge clamp comprising a bolt provided with an elongated slot, a wedge of less width than the length of the slot and adapted to be inserted into said slot at a number of points along the length thereof, and laterally extending engageable parts between the wedge and one of the slot walls permitting sliding of the wedge longitudinally of itself but preventing movement longitudinally of the slot.

5. An adjustable wedge clamp including a bolt provided with an elongated slot, a wedge capable of passing entirely through said slot, and laterally extending engageable parts between the wedge and one of the slot walls permitting sliding of the wedge longitudinally of itself but preventing movement longitudinally of the slot.

HARRY E. PRIEM.